Patented Dec. 9, 1941

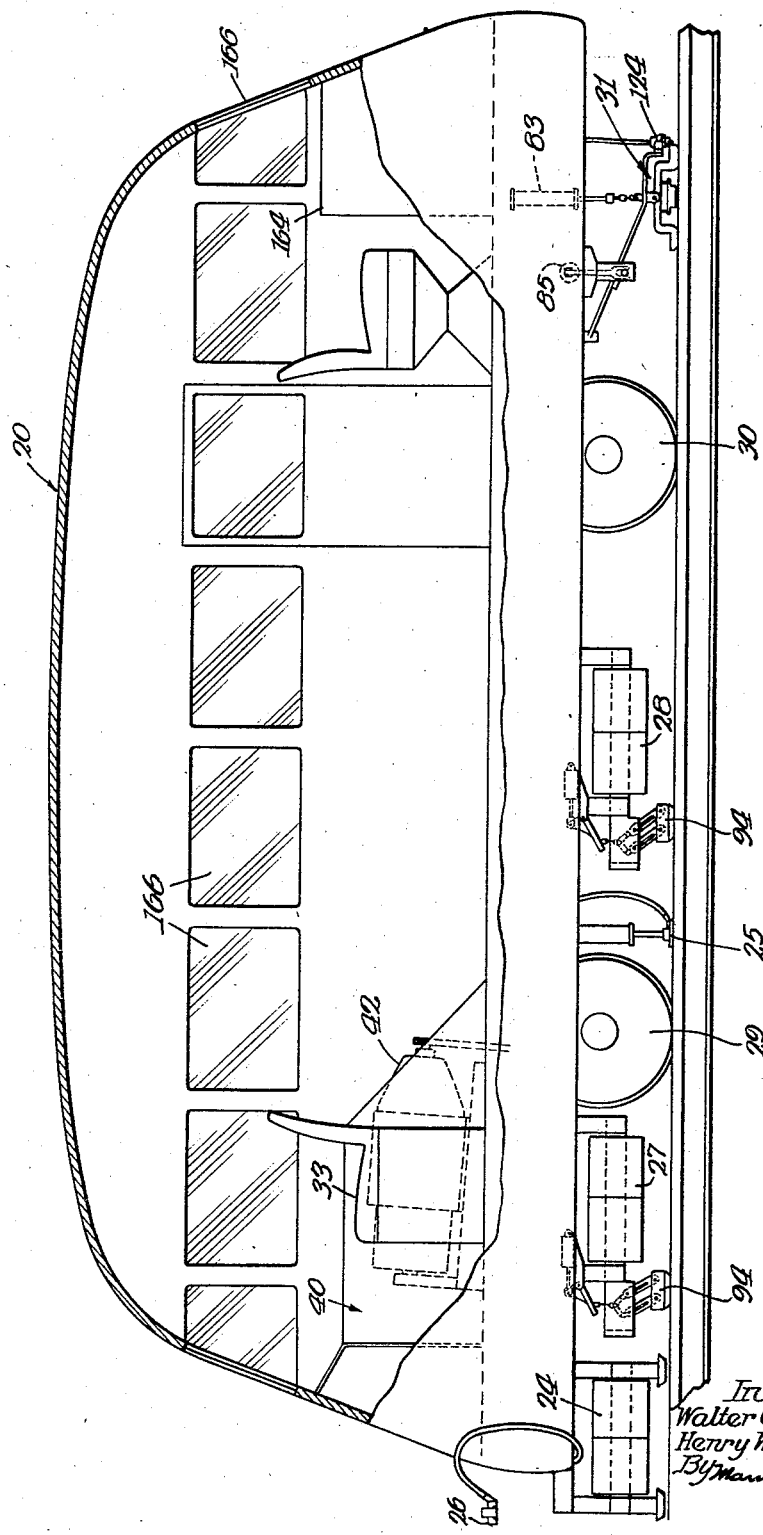

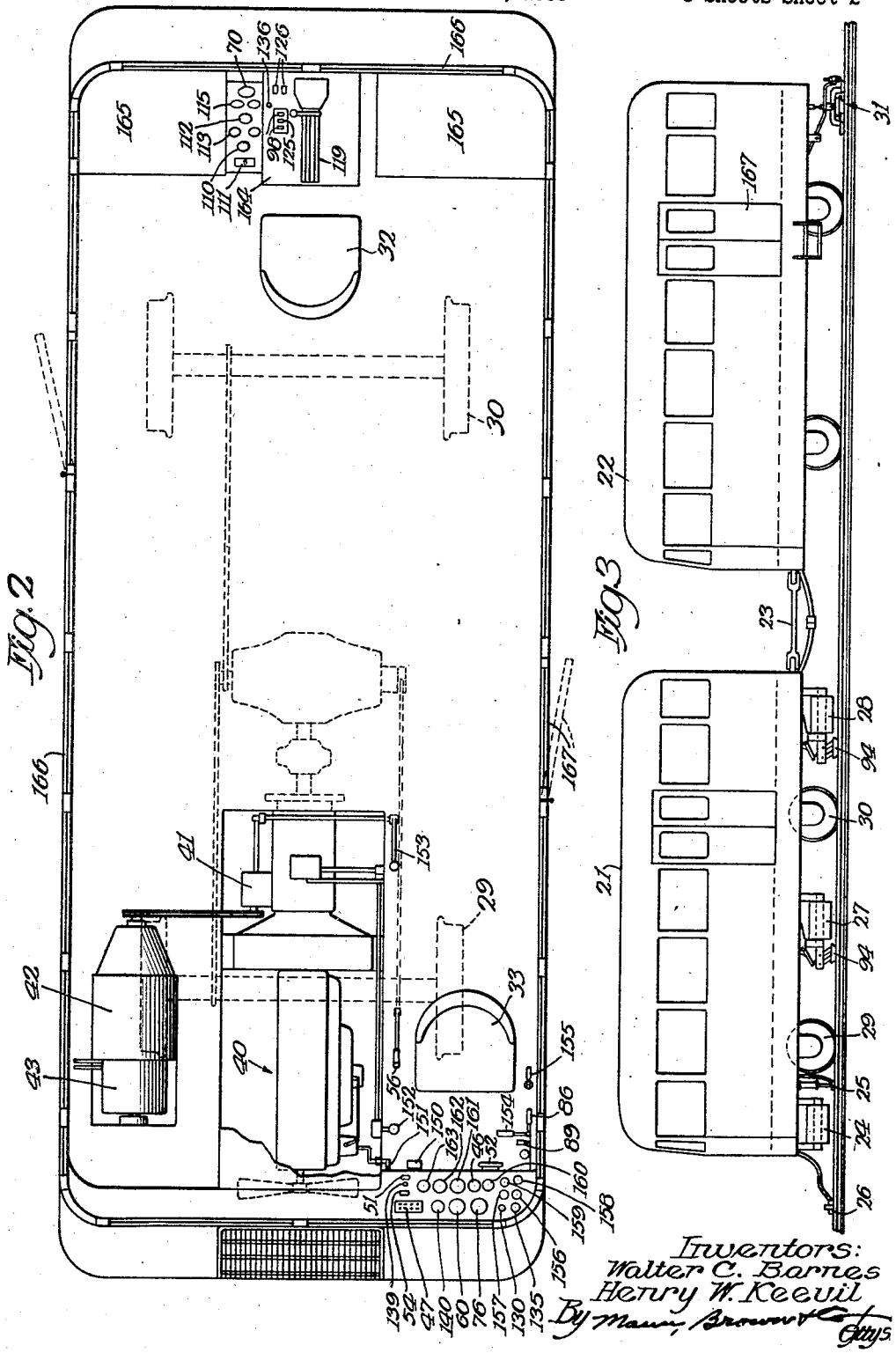

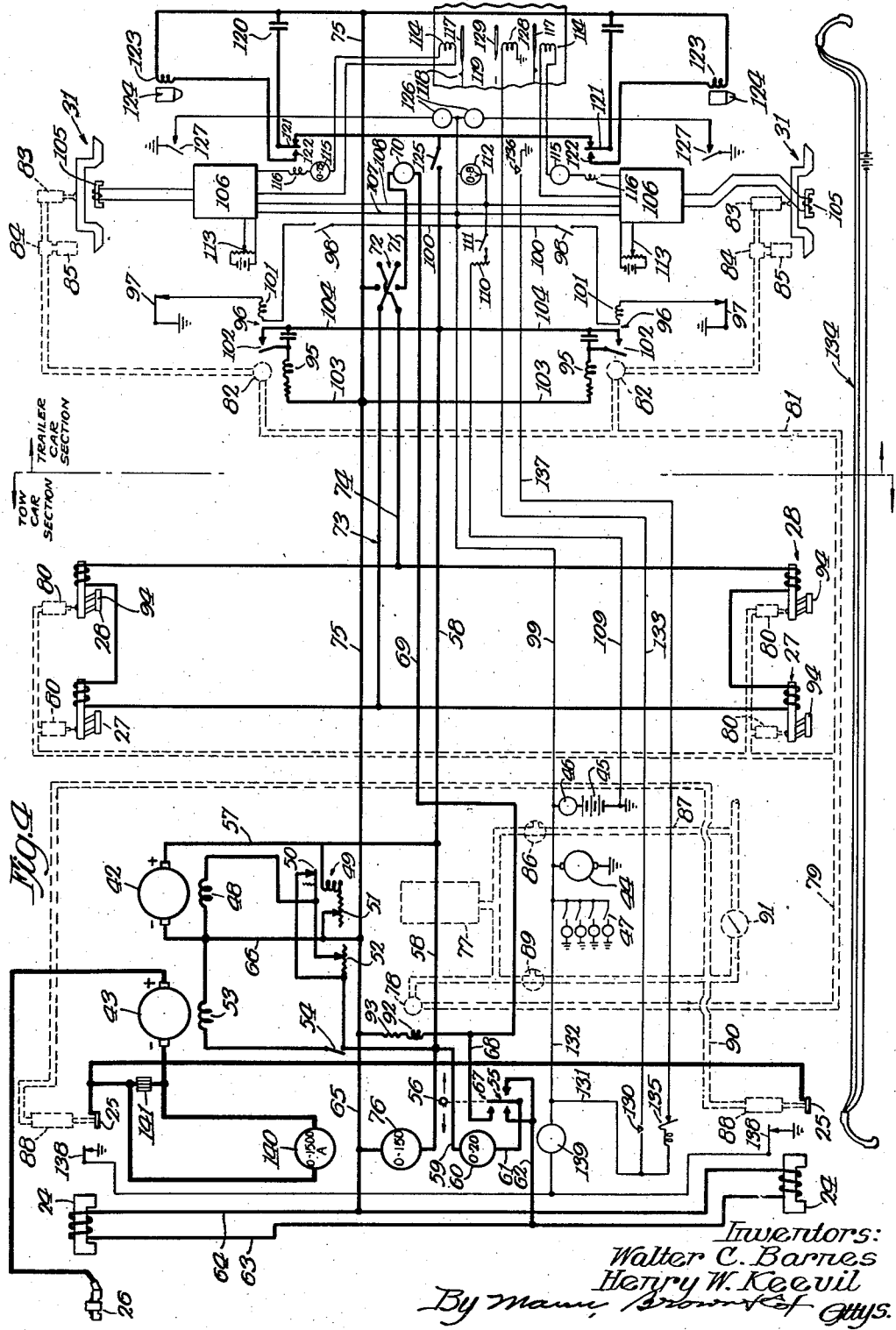

2,265,137

UNITED STATES PATENT OFFICE 2,265,137

RAIL FLAW DETECTOR CAR

Walter C. Barnes, Lake Bluff, and Henry W. Keevil, Highland Park, Ill.

Application June 6, 1938, Serial No. 212,118

19 Claims. (Cl. 175—183)

The detection of flaws in rail for the purpose of locating and removing defective rail has become and will remain an important part of the constant effort which the railroads of America are making to prevent accidents, and to increase the already high standard of safety in rail travel and shipment.

A flaw detector car using methods at present known can test at most approximately 6,000 miles per year, and with a total track mileage of 250,000 miles in the United States, the cost of operating and maintaining a sufficient fleet of cars to take care of the large mileage is very substantial. Then, too, it should be remembered that rail fissures are continually developing in track, and many railroads have already adopted the practice of testing their main high speed track at least twice a year.

Many detector cars in operation today represent an investment of $50,000 or more per car, and their size, basic organization, equipment, and methods of operation necessitate a crew of three or four men to run the car, operate the flaw detection equipment, and take care of ordinary maintenance work. Obviously, the cost of testing rails with equipment of this kind is exceedingly high.

The principal object of this invention is to provide a rail flaw detector car which employs a greatly simplified method of testing, and it is so organized in its arrangement of controls, equipment, etc., that the car can be built at a relatively low cost, and can be operated with a two-man crew.

Additional objects of the invention are to facilitate and speed up the handling and operation of the flaw detection equipment, so that more miles can be tested per day with the car; to so organize and locate the various control apparatus that the driver or power engineer has complete control over and is responsible for the proper operation of all of the power equipment, while the engineer in charge of testing, or operations engineer, has complete control over all of the detecting equipment, exclusive of the power used for that equipment; to place the hand check apparatus at the front of the car where the power engineer can watch the controls while the operations engineer is making the hand test; to provide means for automatically rendering ineffective the main magnets when the car is moving to the rear preparatory to making a repeat test; and to provide other means for rendering the cleanup magnets ineffective while the hand check testing is being done.

Further and other objects will become apparent as the disclosure proceeds and the description is read in conjunction with the accompanying drawings, in which Fig. 1 is a side elevational view of a detector car embodying the principles of this invention;

Fig. 2 is a horizontal, sectional view of the same;

Fig. 3 is a side elevational view of a detector car also embodying the principles of this invention, but which, for convenience, is made into two car sections; and Fig. 4 is a diagrammatic view showing the principal parts of the flaw detection equipment with their electrical and pneumatic controls.

In compliance with section 4888 of the Revised Statutes, a preferred form of the invention has been shown in the drawings and will be described herein, but it should be understood that the invention is not limited to the specific disclosure made, and that the appended claims should be construed as broadly as the prior art will permit.

In the illustrative embodiment of the invention shown, the detector car generally designated 20, may consist of a single car section, as shown in Figs. 1 and 2, or it may comprise a front car section 21 and a rear car section 22, the former serving as a tow car and carrying the rail magnetizing equipment, and the latter serving as a trailer car and serving not only to house and carry the flaw detecting equipment including the flux responsive device, recording apparatus, etc., but also as accommodation quarters for the car crew. When the car is made in two sections, as in Fig. 3, they are preferably joined together by a non-magnetic coupler 23 so that the flux responsive device will be entirely unaffected by stray fields from the rail magnetizing equipment.

When the invention is used with a double section car, the front car section 21 is equipped with a cleanup magnet, generally designated 24, hand check apparatus including a so-called stationary contact 25, a movable contact 26, and a pair of rail energizing magnets, generally designated 27 and 28, respectively. The cleanup magnet 24 and the hand check apparatus are preferably mounted on the car in front of the front car wheel 29, the magnet 27 between the front wheel 29 and the rear wheel 30, and the magnet 28 in rear of the rear wheel 30. The flux responsive device, generally designated 31, is preferably mounted at the rear end of the trailer section 22, all as shown in Fig. 1.

When all of the equipment is mounted on a single section car, the magnet 27 may be mounted in front of the front car wheel 29, as shown in Fig. 1 with the stationary contact 25 of the hand check apparatus in rear of that wheel, and preferably the contact should be well insulated from the car frame. The magnet 28 is moved forward to a position intermediate the wheels 29 and 30, and the flux responsive device 31 is mounted at the rear end of the car. The method which we employ for detecting flaws in rails consists in subjecting the rail to a strong uni-directional magnetic flux, and subsequently, not simultaneously, exploring the space around the rail for traces of residual magnetism. We have found that this method is not only practical from the standpoint of being able to test twenty or thirty miles per day, but that it also makes possible the testing of track with considerably less original cost, and corresponding lower operating cost than flaw detection apparatus now in use.

In the detector cars heretofore used requiring a crew of three or four men, the mass of equipment including the large engine necessary for driving the rail energizing generator used to send five or six thousand amperes through the rail, together with the propulsion engine for the car required a great deal of maintenance work in order to keep the car in proper operating condition. Furthermore, the operations engineer was given the responsibility of seeing that the rail energizing equipment was sending a proper amount of current through the rail, and that other power equipment was functioning properly, all of which tended to divert his attention from his principal responsibility of interpreting the record on the record tape. Then, also, the hand check apparatus was located at the rear of the car so that when the car was backed-up to return to a place in the track where the recorder indicated a possible fissure, some member of the crew had to take his place in front of the current meter to see that the current for the hand check apparatus was of proper value while the operations engineer left the car to make the hand test of the suspected rail.

The present invention seeks to eliminate these inefficiencies and to make it possible for the testing of rail to be accomplished by a two-man crew with responsibilities divided in a way that will permit the operations engineer seated in a seat 32 at the rear of the car to direct his full attention to the functioning of the flaw detection equipment and the interpretation of the record made on the record tape while the power engineer, who is in the driver's seat 33 at the front of the car is constantly checking the operation of the power equipment.

The car is propelled by a 112 H. P. gasoline engine 40 provided with a power takeoff device 41 for driving a 110 volt, 2½ k. w. direct current generator 42, and a 1000 ampere 1½ k. w. direct current generator 43. The two generators are mounted in tandem and have their armatures mechanically connected. The high voltage generator 42 is used for supplying current to the main magnets 27 and 28, the cleanup magnet 24, the solenoid coils of the pneumatic valves, the solenoid coils of the paint guns etc., while the low voltage generator 43 supplies current to the hand check contacts 25 and 26, the latter being associated with a magnetic clamp which automatically grips the rail when current is flowing through the circuit.

In addition to the generators 42 and 43, there is a 6 volt generator 44 associated with the engine 40 and it is wired so that it floats on the battery 45 to keep the battery charged and provide current for the lighting equipment, and certain parts of the signal equipment. An ammeter 46 shows the charging rate of the generator 44 and the discharge from the battery 45. As usual, one side of the generator 44 is grounded with one side of the battery 45. The miscellaneous lighting circuits are indicated by the switches 47.

The field 48 of the 110 volt generator 42 is controlled by a regulator, generally designated 49, which includes a back contact relay 50 and a regulating rheostat 51. The regulator 49 permits the voltage of the generator to build up quickly as the generator is started, and when the voltage reaches the value set by the rheostat 51, the relay 50 operates to throw in the resistance 52 which is in the form of a rheostat. The regulator 49, therefore, serves both as a means for maintaining the voltage of the generator 42 relatively constant, and as a means for determining by manipulation of the rheostat 51 the value at which the generator voltage is to be maintained.

The rheostat 52 controls the field 53 of the low voltage generator 43 which field is energized whenever the switch 54 is closed.

When this occurs, the field 53 of the low voltage generator is thrown in parallel with the field 48 of the high voltage generator, and since the armature of the generator 43 is mechanically connected to the armature of the generator 42, the hand check apparatus is energized.

It is desirable to have the cleanup magnets 24 in operation whenever the car is going forward or rearward, but not when the car is at rest during the hand check testing. This result can readily be accomplished by associating a two-way switch 55 with the direction lever 56 of the car, the switch being arranged so that when the lever is in neutral position, as shown in Fig. 4, the contacts are open, but when in its forward or reverse position, a circuit is completed between the positive side of the armature winding of the generator 42 and one or the other of the contacts comprising the switch 55. This circuit can be traced from the positive side of the generator 42 through conductors 57, 58 and 59, ammeter 60 having a range from 0-20 amperes, conductor 61, direction lever 56, switch 55, conductors 62 and 63, then through the cleanup magnets and back to the negative side of the generator 42 through conductors 64, 65 and 66.

On the other hand, it is desirable to have the main magnets 27 and 28 energized whenever the car is moving forward, but not when the car is stopped or when it is moving to the rear. This is accomplished by providing a switch 67 associated with the direction lever 56 and arranged so that when the lever is moved to forward position, the circuit through the magnets 27 and 28 is closed, the circuit being traced from the positive side of the generator 42 through conductors 57, 58 and 59, ammeter 60, conductor 61, direction lever 56, switch 67, conductors 68, 69, ammeter 70 (which is a duplicate of ammeter 60) conductor 71, reversing switch 72, thence through one or the other of conductors 73 and 74 which are connected across the coils of the magnets 27 and 28 and back to the negative side of the generator through conductors 75 and 66.

Obviously when the direction lever 56 is in neutral position, or in reverse position, the switch 67 is opened so that the main magnets 27 and 28 are de-energized.

The voltage across the generator 42 may be observed on the voltmeter 76 which is connected across the negative conductors 65 and 66 and the positive conductors 58 and 57. The voltmeter is preferably capable of reading from 0 to 150 volts.

All of the flaw detection equipment which, in operative position, rests upon or is closely adjacent to the rail, must be capable of being raised to a position which is sufficiently above the rail surface so that when the car is running light, there is no danger of the equipment being damaged. The raising of all of such equipment is accomplished by springs, and the lowering of the equipment by a pneumatic system which comprises an air reservoir 77, a master control valve 78 (solenoid operated) a pipe 79 which leads to the cylinders 80 associated with the main magnets 27 and 28, a pipe 81 leading to the solenoid operated control valves 82 which, when opened, permit air to be introduced into the cylinder 83 which moves the flux responsive device 31 downwardly to the rail surface, after which, by reason of the action of an air operated time delay device diagrammatically indicated at 84, air is introduced into the transverse cylinders 85 which act laterally on the supporting arm of the flux responsive device and hold it against the gauge side of the rail.

The pneumatic system also includes means for operating the air brakes by manipulation of a valve 86 in pipe 87, the valve being associated with the portion of the pneumatic system controlling the hand check cylinders 88 in such a way that whenever air is allowed to enter the cylinders 88, the air brakes are applied, although the air brakes may be applied independently of the actuation of the hand check cylinders 88. This is accomplished by a system of pipes arranged so that when the valve 89 is in position to pass air from the reservoir 77 to the cylinders 88, the system automatically permits air to flow through a one way check valve 91 to the air brakes, thereby by-passing the air brake control valve 86 and applying the brakes. Since the check valve permits air to pass only in one direction, operation of the air brake valve 86 does not permit air to pass from the reservoir 77 to the hand check cylinders 88 unless the valve 89 has been manually opened.

The solenoid 92 which operates the master control valve 78 of the pneumatic system is connected across the conductors 65 and 66 so that it is subject to the action of the switch 67. It should be understood that there is sufficient resistance in the solenoid 92 and in the resistance 93 placed in series with the solenoid that only a small amount of current passes through the solenoid to permit the shunt circuit including the windings of the magnets 27 and 28, to function properly. As a result, the master control valve 78 is opened whenever the switch 67 is closed, thus permitting air to flow from the reservoir 77 to the cylinders 80 to lower the movable pole pieces 94 into contact with the rail.

It should be understood that hand switches may be provided in the cleanup magnet circuit and the main magnet circuit so that these circuits can be opened irrespective of the position of the direction lever 56.

The opening of the master control valve 78 also permits air under pressure to pass into the pipe 81 for operation of the cylinders associated with the flux responsive device 31. The valve 82 which controls the passage of air from the pipe 81 to operate the cylinders is controlled by a solenoid 95 which is energized through a time delay relay 96 whenever the series switches 97 and 98 are closed to complete an electrical circuit from the battery 45 through conductors 99 and 100, switch 98, relay coil 101 of the time delay relay 96, and switch 97 to ground.

The switch 98 is a hand switch controlled by the operations engineer and the switch 97 is an automatic switch carried on the arm which supports the flux responsive device and automatically opened whenever the arm is swung through a horizontal angle greater than normal, as for example when the flux responsive device is inadvertently derailed by a switch, frog, or the like. The opening of the circuit through the relay coil 101 immediately closes the contact 102 with the result that the 110 volt circuit through the solenoid 95 of the control valve 82 is immediately opened, this circuit including conductors 103 and 104 connected, respectively, to the negative and positive sides of the generator 42 through leads 75 and 58, respectively. When the switch 97 is again closed by automatic centering mechanism, the relay 96 automatically closes after a predetermined time interval, thereby energizing the solenoid 95 again and opening the control valve 82 to operate the cylinders 83 and 85.

Each of the flux responsive devices 31 on opposite sides of the car includes a detector coil 105 having its winding connected to the input side of an amplifier generally indicated 106. The amplifier, for the purpose of this disclosure, may be considered as a conventional thermionic amplifier, the heater circuit of which includes conductors 107 and 108 connected across the battery 45 through conductors 99 and 109, respectively, a variable rheostat 110 and switch 111 being inserted in series with the latter conductor to control the feeding of current to the heating filaments of the thermionic apparatus. A voltmeter 112 connected across the conductors 107 and 108 and reading from 0–8 volts indicates the voltage on the heater circuit.

The sensitivity of each amplifier is controlled by a grid bias rheostat 113 or equivalent means, and the output from the amplifier leads to a pen relay 114 connected in series with a milliammeter 115 preferably reading from 0–25 milliamperes, and a paint gun relay 116. The pen relay 114 when energized actuates a pen 117 which causes an indication to be made as shown at 118 on the record tape 119, a fragment of which is shown.

The paint gun relay 116 when energized causes a condenser 120 to discharge through the switch armature 121, contact 122 and the operating coil 123 of the paint gun generally indicated at 124, the condenser having been previously charged by being connected across the conductor 75 and conductor 58 which in turn connect with the negative and positive sides of the generator 42 through conductors 66 and 57, respectively. A switch 125 is provided to open the paint gun circuit when desired.

In order that the operations engineer can tell when the flux responsive devices are in proper contact with the rail, a tell-tail light signal 126 is provided for each flux responsive device. The light is illuminated whenever the switch 127 associated with the flux responsive device is closed, this operation of the switch occurring whenever the flux responsive device is properly seated on the rail. The circuit can be traced from the battery 45 through conductor 99, signal 126, and switch 127 to ground.

In addition to the pen relays 114 which are actuated by the flux responsive devices 31, there is also a "land mark" pen relay 128 having a pen 129 which is actuated by the power engineer in the driver's seat by means of a push button 130. One side of the push button is connected by conductors 131 and 132 to the positive side of the battery 45 and the other side of the push button is connected by a conductor 133 with the operating coil of the land mark pen relay 128. Whenever a land mark indication is made by the power engineer, the operations engineer places a notation alongside of the indication to identify the landmark.

When the detector car comprises a double section, the mechanical, electrical and pneumatic equipment is divided as indicated by the appropriately labeled dotted line. In a double section car, communication between the operations engineer and the power engineer is preferably maintained by a telephone generally indicated at 134, and a buzzer system, although either or both of them may be used in a single section car, if desired. The buzzer system includes a buzzer 135 at the front of the car and a push button 136 at the rear of the car, the two being connected in series with the battery 45 through the conductors 132, 131 and 137.

In order that the power engineer may at all times know when the hand check contacts 25, or either of them, are in their lowered position, a switch 138 is provided which is closed whenever the contact is lowered, thereby illuminating the telltale light signal 139 in series with the switch and the battery 45. An ammeter 140, preferably reading from zero to 1500 amperes, is connected across a shunt 141 to indicate the current flowing between the contacts 25 and 26. As stated before, this low voltage, high amperage circuit is opened and closed by manipulation of the switch 54 in series with the field 53 of the generator 43.

Referring now to Figs. 1–3 inclusive, the physical location of the various parts—operating equipment, meters, gauges and the like, are shown. The propulsion engine 40 is shown located at the center of the car in the front with the generators 42 and 43 on one side and the driver's seat 33 on the other. Immediately adjacent to the driver's seat and within reach or sight of the driver or power engineer are the following: Clutch 150, governor control handle 151 (which is used to change the governor control from high speed light running adjustment to low speed test running adjustment) gear shift lever 152, direction lever 56, power take-off control lever 153, throttle 154, air brake valve 86, hand check contact cylinder valve 89, hand brake 155, field rheostat 52, air gauge 156 for the reservoir 77, air gauge 157 for the brake cylinder, pressure regulator 158 for the tank containing the paint supplied by the gun 124, low pressure air gauge 159 used with the paint gun, gasoline gauge 160, battery charge ammeter 46, speedometer 161, oil pressure gauge 162, voltmeter 163, field switch 54, hand check tell-tale light 139, field relay 51, buzzer 135, land mark push button 130, 150 v. voltmeter 76, 20 ampere ammeter 60, 1500 ampere ammeter 140, and miscellaneous light switches indicated generally at 47.

Closely adjacent to and within sight and reach of the seat 32 for the operations engineer are the following: The record tape 119 which is automatically moved continuously in proportion to car speed on the recorder table 164; 20-ampere ammeter 70 for the main magnets 27 and 28; 25-milliampere milliammeters 115 for indicating the output of the amplifiers 106; 8 v. voltmeter 112 for indicating the voltage on the meter circuit of the amplifiers, potentiometers 113 controlling the sensitivity of the amplifiers, heater rheostat 110 controlling the voltage on the heater circuit; switch 111 for opening the heater circuit; switches 98 for controlling the raising and lowering of the detector carriages 31; switch 125 controlling the paint gun circuit; and telltale lights 126 indicating when the detector carriages are lowered.

The amplifiers are preferably mounted in the boxes 165 on opposite sides of the recording table 124, and a suitable sensitometer is carried in one of these boxes for quick attachment to the amplifiers for regulating their sensitivity.

It should be understood that the rear of the car, as well as the sides, is provided with windows 166 so that the operations engineer can at all times watch the rail which has been gone over by the car. When he sees an indication on the record tape which does not correspond to a visible surface defect on the rail, as observed through the window 166, the operations engineer presses the push button 136 to signal the driver to stop. The car is then backed up by placing the direction lever 56 in reverse and automatically the main magnets 27 and 28 are de-energized, although the cleanup magnets 24 remain energized. When the car has been backed up a sufficient distance to enable a repeat run to be made, the operations engineer presses the push button 136, and a second run over the suspected rail is made under ordinary testing conditions with the direction lever 56 forward to again close the circuit through the main magnets 27 and 28 and to keep the circuit closed through the cleanup magnets 24. If the repeat run again produces the indication on the record tape which was before observed, the car is stopped and the operations engineer gets out of the car with the millivoltmeter that is used in connection with the electrical drop in potential hand testing apparatus. He signals the power engineer by hand to back up until the place marked by the paint gun as the location of the suspected fissure is a short distance in front of the car. The operations engineer then takes the movable contact 26 and places it on the rail in front of the suspected fissure while the power engineer lowers the contact 25 and closes the switch 54, adjusting, if necessary, the field rheostat 52 to see that a sufficient current is being passed through the rail. The operations engineer then makes the hand test of the rail, and if the hand test, or secondary flaw detection system, verifies the indication of the primary flaw detection system, the rail is known to be defective and its removal is immediately ordered. After the hand test has been completed, the operations engineer places the movable contact 26 on a hook provided at the front of the car, the power engineer raises the contacts 25, opens the switch 54, and moves the car forward so that the operations engineer can mount the car through the door 167. The test work is then continued with the primary flow detection apparatus until another indication of the same character is received, and the procedure described above is repeated.

It will be seen from the above that the amount of equipment necessary for detecting flaws in rail according to our invention is held to a minimum with the necessary maintenance therefor correspondingly small. The apparatus, control equipment, indicating gauges and meters are located so that test work can be done with the greatest possible speed and accuracy, and that all of these desired results can be achieved with a two-man crew and a car of moderate cost.

We claim:

1. A self-propelled car for detecting flaws in rails adapted to be operated by a two-man crew and comprising a chassis having wheels, a house body mounted on the chassis, a driver's seat at the front of the car and an operator's seat at the rear of the car, a prime mover adapted to propel the car, a generator optionally driven by the prime mover, primary flaw detecting apparatus including an amplifier and a recorder both located at the rear of the car adjacent to the operator's seat, control means for the amplifier and recorder accessible from the operator's seat, flux producing means operable by power made available by the generator, means for controlling the electrical characteristics of the flux producing means from a point adjacent to the driver's seat, and car propulsion control equipment adapted to be manipulated from the driver's seat.

2. In a car for detecting flaws in rails, a closed body mounted on a wheeled chassis, a prime mover, a generator driven by the prime mover, primary flaw detecting apparatus including flux producing means, a detector, an amplifier, a recorder, car propulsion control equipment and generator control means positioned at the forward end of the car, and amplifier and recorder control means positioned at the rear of the car.

3. In a car for detecting flaws in rails, a closed body mounted on a wheeled chassis, a prime mover, a generator driven by the prime mover, primary flaw detecting apparatus including flux producing means, a detector, an amplifier, a recorder, car propulsion control equipment and generator control means positioned at the forward end of the car, amplifier and recorder control means positioned at the rear of the car, secondary flaw detecting apparatus used when the car is stationary and comprising a pair of electrical contacts, one of which is adapted to be temporarily connected to the rail at a point ahead of the car, and control means for the secondary flaw detecting apparatus located at the forward end of the car.

4. In combination with a car for testing flaws in rails having a primary flaw detecting apparatus including a magnet positioned adjacent to one of the rails to be tested and a secondary flaw detecting apparatus including a pair of electrical contacts adapted to engage the rail, a prime mover for propelling the car, high and low voltage generators for supplying current to the magnet and contacts respectively, and means for selectively operating said generators from the prime mover by using the electrical output of one generator to excite the field of the other generator.

5. In combination with a car for testing flaws in rails having a primary flaw detecting apparatus including a magnet positioned adjacent to one of the rails to be tested and a secondary flaw detecting apparatus including a pair of electrical contacts adapted to engage the rail, a prime mover for propelling the car, high and low voltage generators for supplying current to the magnet and contacts respectively, and means for selectively operating said generators from the prime mover, said means including a power take-off device for one generator to excite the field of the other generator.

6. In combination with a car for testing flaws in rails having a primary flaw detecting apparatus including a magnet positioned adjacent to one of the rails to be tested and a secondary flaw detecting apparatus including a pair of electrical contacts adapted to engage the rail, a prime mover for propelling the car, high and low voltage generators for supplying current to the magnet and contacts respectively, and means for selectively operating said generators from the prime mover, said generators being mounted in tandem and the field of one generator optionally excited by the output of the other generator.

7. In combination with a car for testing flaws in rails having a primary flaw detecting apparatus including a magnet positioned adjacent to one of the rails to be tested and a secondary flaw detecting apparatus including a pair of electrical contacts adapted to engage the rail, a prime mover for propelling the car, high and low voltage generators mounted in tandem with their armatures mechanically connected for supplying current to the magnet and contacts respectively, and means for closing the field circuit of the low voltage generator with the output circuit of the other generator.

8. In combination with a car for testing flaws in rails having a primary flaw detecting apparatus including a magnet positioned adjacent to one of the rails to be tested and a secondary flaw detecting apparatus including a pair of electrical contacts adapted to engage the rail, a prime mover for propelling the car, high and low voltage generators for supplying current to the magnet and contacts respectively, a power take-off from the prime mover for driving the generators, and means for connecting one generator in series with the field of the other.

9. In a car for detecting flaws in rails, primary flaw detecting apparatus including means for passing a magnetic flux longitudinally through a portion of the rail, when the car is moving forwardly a cleanup magnet in advance of said means, secondary flaw detecting apparatus including a low voltage generator and a pair of contacts adapted to be placed in engagement with the rail when the car is stationary, and means for rendering the cleanup magnet ineffective automatically when the secondary flaw detecting apparatus is being used and effective when the primary flaw detecting apparatus is effective.

10. In combination with a car for testing flaws in rails having a primary flaw detecting apparatus and a secondary flaw detecting apparatus including a pair of electrical contacts adapted to engage the rail, a prime mover for propelling the car, generators for supplying the current to the primary and secondary flaw detecting apparatuses respectively, and means for selectively operating the generators from the prime mover by reducing the load of one generator and using the current thereby provided by that generator to excite the field of the other generator.

11. In a car for detecting flaws in rails, primary flaw detecting apparatus including a source of electrical power, secondary flaw detecting apparatus including a generator and a contact adapted to be manually positioned on the rail by the observer of a car in view of the driver, and means for automatically raising and lowering the primary flaw detecting apparatus upon stopping the car so that said source of electrical power is available and controlled by the driver to energize and to excite the field of the generator.

12. In a rail flaw detector car having brakes, a prime mover and two control stations, a plurality of generators driven by the prime mover, means for moving the car by the prime mover including a control at the forward station having a neutral position, a primary detector energized by one of the generators, a second detector energized by a second generator, a switch means at the forward station disconnecting the primary detector from the first generator when the control is in neutral position and for connecting the first generator in series with the field of the second generator, means controlled by said disconnection for raising automatically the first detector from the rails, and means operatively associated with the application of the brakes for lowering the second detector to the rail.

13. In a rail flaw detector car having a prime mover and two control stations, a low voltage generator and a high voltage generator driven by the prime mover, a forward and reverse control at the forward station having a neutral position, a primary detector, a hand detector, a switch associated with said control and closed when the control is forward for energizing the primary detector, means responsive to said energization for lowering the primary detector to operative position, and switch means at the forward station operable in conjunction with the control, when the control is in neutral, for energizing the hand detector.

14. In a rail flaw detector car having a prime mover and two control stations, a low voltage generator and a high voltage generator driven by the prime mover, a forward and reverse control at the forward station having a neutral position, a primary detector, a hand detector, a switch associated with said control and closed when the control is forward for energizing the primary detector, means responsive to said energization for lowering the primary detector to operative position, control means located at the forward station and associated with the brakes for lowering the hand detector to the rail, and means controlled at the forward station for connecting the field of one of the generators in series with the current output of the other generator.

15. In a rail flaw detector car having a low voltage generator and a high voltage generator, means for selectively operating the generators comprising a switch connecting the field of the low voltage generator to the current output of the high voltage generator, and means for controlling the output of the low voltage generator including a variable resistance in the field of the high voltage generator which may be varied to maintain the output of the low voltage generator constant under varying load conditions of the high voltage generator and flaw detectors energized independently of each other by said generators, respectively.

16. In a rail flaw detecting car having a prime mover and high and low amperage generators adapted to be driven from the prime mover, a driver's seat at the front of the car and an operator's seat at the rear of the car, the combination of a control for the operation of the generators and the movement of the car adjacent the driver's seat, means at the driver's seat for raising and lowering flux inductive devices powered by the generators, means controlled by the driver for deenergizing the rail when the car is moved rearwardly, and hand check means located at the front of the car within the driver's view.

17. In a vehicle for detecting flaws in rail, a plurality of cars coupled together, primary flaw detecting apparatus carried by the rearmost car including a power source disposed in the front car, secondary flaw detecting apparatus including a generator in the front car and a contact carried by the front car and adapted to be manually positioned on the rail ahead of the front car, and means for controlling the power source and the generator from the front of the front car.

18. In a device for detecting flaws in rails including a car, primary flaw detecting apparatus including means for passing a magnetic flux longitudinally in a given direction through a portion of the rail, and a cleanup magnet in advance of said means, means for automatically rendering the cleanup magnet operative whenever the device is in motion and inoperative when the device is stopped, and means for automatically rendering the first named means in effective whenever the device is moved rearwardly.

19. In a rail flaw detecting car having a prime mover and high and low amperage generators adapted to be driven from the prime mover, a driver's seat at the front of the car, and an operator's seat at the rear of the car, the combination of a control for the operation of the generators and the movement of the car adjacent the driver's seat, means at the driver's seat for raising and lowering flux inductive devices powered by the generators, and hand check means located at the front of the car within the driver's view.

WALTER C. BARNES.
HENRY W. KEEVIL.